United States Patent
Paral

(10) Patent No.: US 9,048,948 B2
(45) Date of Patent: Jun. 2, 2015

(54) DEVICE FOR TRANSMITTING DATA BETWEEN TWO RAILWAY VEHICLES USING OPTICAL RADIO RELAY

(75) Inventor: Thomas Paral, Eppelheim (DE)

(73) Assignee: ERA-Contact GmbH (DE)

( * ) Notice: Subject to any disclaimer, the term of this patent is extended or adjusted under 35 U.S.C. 154(b) by 111 days.

(21) Appl. No.: 13/810,542

(22) PCT Filed: Jul. 5, 2011

(86) PCT No.: PCT/EP2011/061280
§ 371 (c)(1),
(2), (4) Date: Jan. 16, 2013

(87) PCT Pub. No.: WO2012/010409
PCT Pub. Date: Jan. 26, 2012

(65) Prior Publication Data
US 2013/0114964 A1 May 9, 2013

(30) Foreign Application Priority Data

Jul. 20, 2010 (DE) .......................... 10 2010 036 521

(51) Int. Cl.
*H04B 10/11* (2013.01)
*B61L 15/00* (2006.01)
*H04B 10/00* (2013.01)

(52) U.S. Cl.
CPC ............ *H04B 10/11* (2013.01); *B61L 15/0036* (2013.01); *H04B 10/22* (2013.01); *B60L 2200/26* (2013.01); *Y02T 90/16* (2013.01)

(58) Field of Classification Search
CPC ....................................... H04B 10/22

USPC ................................................... 398/118–131
See application file for complete search history.

(56) References Cited

U.S. PATENT DOCUMENTS

| 4,310,767 A | 1/1982 | Peacock |
| 5,038,406 A | 8/1991 | Titterton et al. |
| 5,857,042 A * | 1/1999 | Robertson et al. .............. 385/33 |
| 5,917,632 A * | 6/1999 | Lesesky ........................ 398/106 |
| 6,414,774 B1 * | 7/2002 | Scifres .......................... 398/129 |
| 6,487,022 B1 | 11/2002 | Okorogu |

(Continued)

FOREIGN PATENT DOCUMENTS

| CN | 101323310 A | 12/2008 |
| CN | 101485153 A | 7/2009 |
| DE | 564764 C | 11/1932 |

(Continued)

OTHER PUBLICATIONS

Paral, Thomas: "IP network backbone with era-transceiver, 1 GBit/s communication over automatic couplers", Nov. 2009, pp. 1-31, XP002666073.

(Continued)

*Primary Examiner* — Nathan Curs
(74) *Attorney, Agent, or Firm* — Harness, Dickey & Pierce, P.L.C.

(57) ABSTRACT

The invention relates to a device (10) for transmitting data between two rail vehicles (12, 14). At each rail vehicle (12, 14) one data transmission unit (16 to 22, 80, 90, 92) is arranged, wherein between the data transmission units (16 to 22, 80, 90, 92) a data transmission link for transmitting data is formed. Data transmission via this data transmission link is carried out by means of an optical radio relay system.

13 Claims, 4 Drawing Sheets

(56) References Cited

U.S. PATENT DOCUMENTS

2004/0120717 A1* 6/2004 Clark et al. .................. 398/118
2010/0029209 A1* 2/2010 Daum et al. .................. 455/59

FOREIGN PATENT DOCUMENTS

| DE | 3248544 A1 | 7/1984 | | |
|---|---|---|---|---|
| DE | 19717926 A1 | 12/1998 | | |
| DE | 10-2004-037849 A1 | 7/2005 | | |
| DE | 102004037849 A1 | 7/2005 | | |
| DE | 10-2006-028288 A1 | 12/2007 | | |
| DE | 10-2007-014229 A1 | 10/2008 | | |
| DE | 200710014229 | * | 10/2008 | ............... G05D 3/12 |
| JP | 58-222703 | 12/1983 | | |
| JP | 2007-318466 A | 12/2007 | | |
| JP | 2010-115944 A | 5/2010 | | |

OTHER PUBLICATIONS

International Search Report (in German and English) and Written Opinion (in German) for PCT/EP2011/061280, mailed Jan. 19, 2012; ISA/EP.
Japanese Office Action for Japanese Patent Application No. 2013-520043 mailed Jan. 21, 2014 (3 pages) (English translation).
PCT/EP2011/061280 International Preliminary Report on Patentability (German and Engish translation) dated Jan. 31, 2013.
Chinese Office Action for Application No. 2011-800354871 dated Oct. 30, 2014 (2 pages).

* cited by examiner

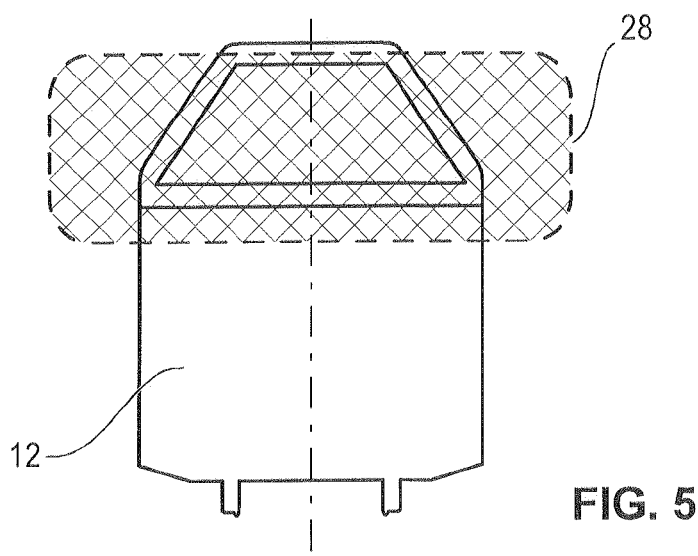
FIG. 5
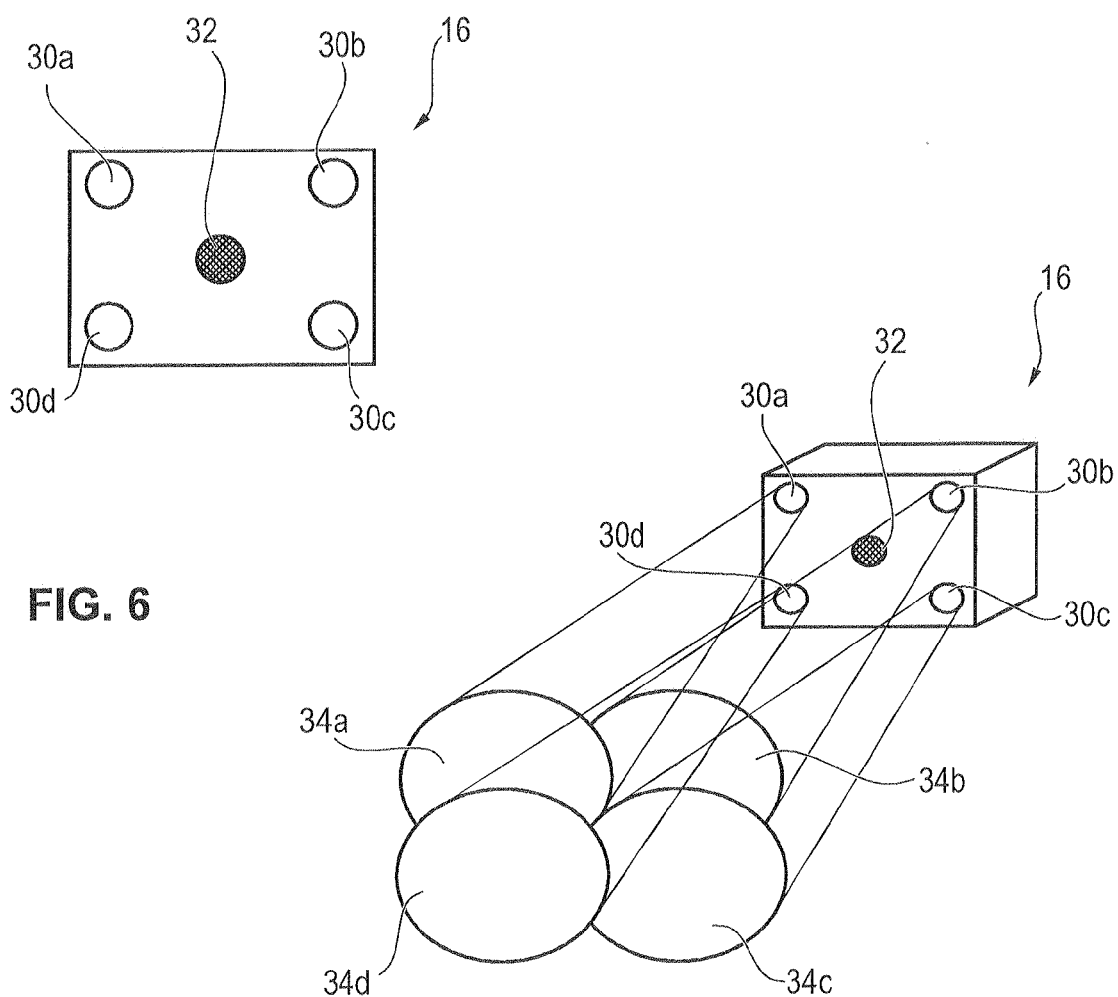
FIG. 6
FIG. 7

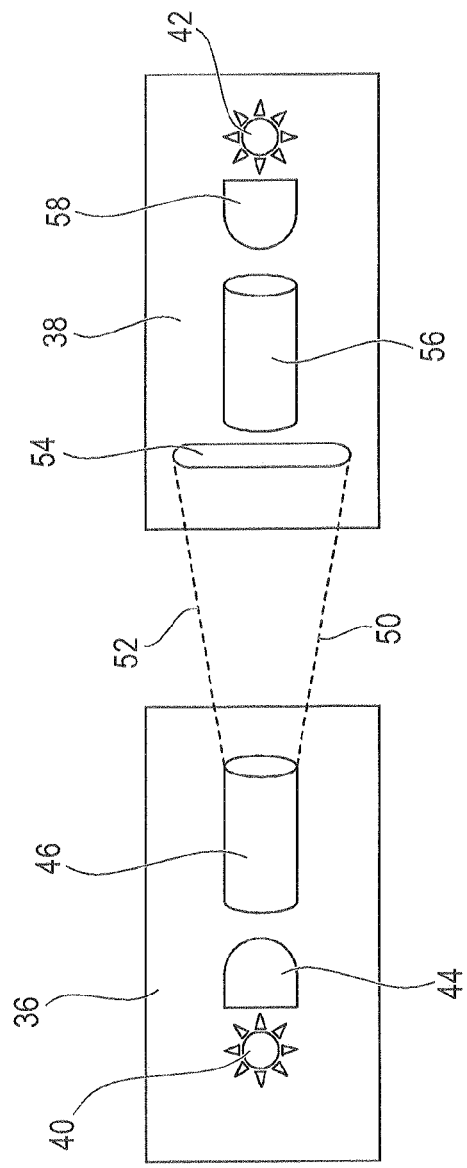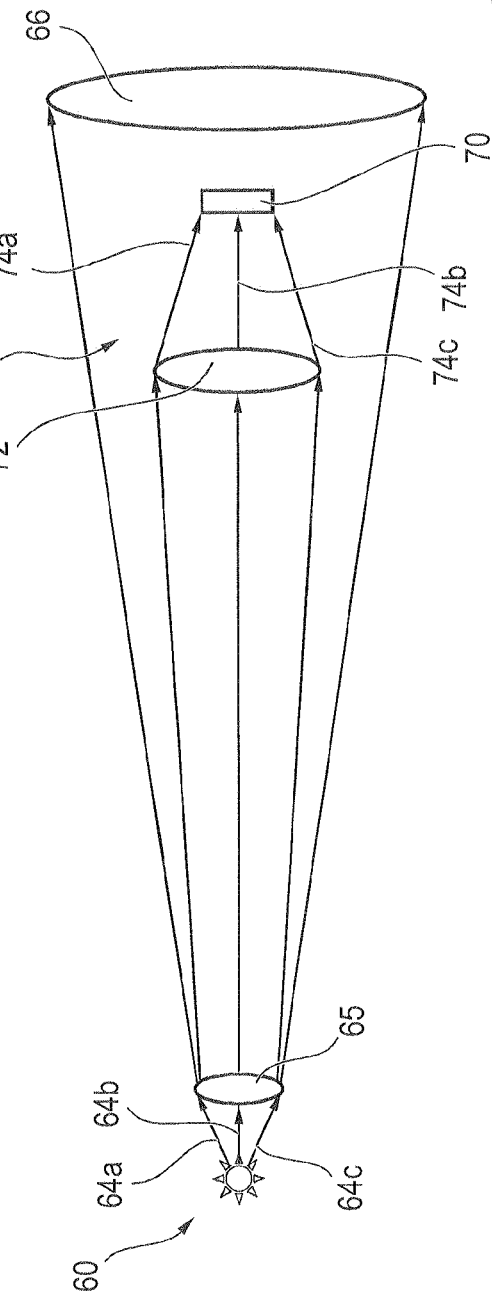

DEVICE FOR TRANSMITTING DATA BETWEEN TWO RAILWAY VEHICLES USING OPTICAL RADIO RELAY

CROSS-REFERENCE TO RELATED APPLICATIONS

This application is a National Stage of International Application No. PCT/EP2011/061280, filed Jul. 5, 2011, and published in German as WO 2012/010409 A2 on Jan. 26, 2012. This application claims the benefit and priority of German Application No. 10 2010 036 521.1, filed Jul. 20, 2010. The entire disclosures of the above applications are incorporated herein by reference.

BACKGROUND

This section provides background information related to the present disclosure which is not necessarily prior art.

1. Technical Field

The invention relates to a device for transmitting data between two rail vehicles, wherein at the first rail vehicle a first data transmission unit and at the second rail vehicle a second data transmission unit is arranged. Between the data transmission units a data transmission link for transmitting data between the two rail vehicles is formed.

2. Discussion

One possibility of transmitting data between two rail vehicles is a wired transmission. For this a mechanical data transmission link via a coupling is formed between the two rail vehicles. The problem here is that with such a data transmission link a retrofitting of rail vehicles that are not yet provided with such a device can only be achieved with a great deal of effort.

Another possibility of transmitting data between two rail vehicles is a wireless transmission of data via a wireless-LAN or bluetooth. The problem with this is that only a limited, relatively small transmission rate can be achieved and that the data transmitted via such data transmission links can easily be intercepted and manipulated by unauthorized persons, so that these transmission methods are only suitable for not safety-related data.

SUMMARY OF THE INVENTION

It is an object of the invention to designate a device for transmitting data between at least two rail vehicles, with which a secure transmission of data to be transmitted can be carried out in a simple manner.

By transmitting the data via the data transmission link by means of an optical radio relay system it is guaranteed that that these data, unlike in different wireless solutions, cannot be simply intercepted and manipulated. Thus, via the optical radio relay system safety-related data can be transmitted as well. By establishing the data transmission link via such a wireless optical radio relay system the components of the device can be simply retrofitted at existing rail vehicles, as a mechanical connection is not necessary. Thus, a potential-free signal transmission is guaranteed, enabling the transmission of large bandwidths.

The first data transmission unit and the second data transmission unit preferably each comprise a transmitter and at least two receivers. By providing several receivers per data transmission unit it is achieved that in case of position changes between both rail vehicles during regular operation of both rail vehicles, for example in case of driving along curves (changes of the yawing angle) or in case of changes of the climbing gradient (changes of the pitch angle) a secure data transmission is guaranteed. Alternatively, the first data transmission unit and/or the second data transmission unit can each comprise one receiver and at least two transmitters, each of the at least two transmitters transmitting the transmitted data in parallel.

In a preferred embodiment of the invention the first data transmission unit and/or the second data transmission unit each comprise at least two transmitters and at least two receivers. By this, in case of a change of the relative position of the rail vehicles to each other a secure transmission of the data to be transmitted is guaranteed.

Further, it is advantageous if the first data transmission unit and/or the second data transmission unit each comprise at least one transceiver. By means of the transceiver a transmitter and a receiver are combined, achieving a simple, cost-effective design of the data transmission unit.

In a preferred embodiment of the invention the first data transmission unit and/or the second data transmission unit each comprise four, preferably eight transmitters arranged in a rectangle, and a receiver arranged in the center of this rectangle. In this manner, it is possible to achieve a reliable data transmission at different relative positions of the rail vehicles to each other with few transmitters and receivers.

The first data transmission unit and/or the second data transmission unit each comprise in particular at least one diode, preferably a laser diode. In particular, the laser diode serves as transmission light source of the optical radio relay system for data transmission.

Here, in particular laser diodes with a wavelength in the range between 800 nm and 900 nm, preferably with a wavelength of 850 nm are used. In particular, the laser diodes have a performance in the range between 1 µW and 25 µW, so that the laser diodes meet the criteria of the protection class 1M according to EN6025-1. By this, it is achieved that no further safety measures are necessary, as the laser light emitted is not dangerous for persons. Further, the diodes can be obtained easily and cost-effectively.

The data transmission units are in particular arranged at the ends of the two rail vehicles that face each other. The distance between the first data transmission unit and the second data transmission unit has in particular a value in the range between 1500 mm and 6000 mm. In a preferred embodiment the distance has a value in the range between 2000 mm and 4000 mm.

Further, it is advantageous if the first data transmission unit and/or the second data transmission unit each illuminate an area in the range between 4500 mm×1300 mm to 5000 mm×1700 mm in the distance of both data transmission units to each other. It is especially advantageous if each of them illuminates an area of 4700 mm×1550 mm. By this, it is achieved that despite all position changes of both rail vehicles to each other occurring during regular rail operation, namely changes of the yawing angle, changes of the pitch angle and changes of the roll angle during drive of the rail vehicles, nonetheless always a data transmission link between the first data transmission unit and the second data transmission unit is formed, so that the data to be transmitted are reliably transmittable by means of the optical radio relay system. Further, by means of the afore-mentioned areas it is achieved that despite the secure data transmission the illuminated area is limited such that no rail vehicles driving on a rail arranged next to the rail on which the both rail vehicles are driving are in the illuminated area, so that no faulty transmissions to potential data transmission units of these rail vehicles occur.

The first data transmission unit and/or the second data transmission unit each comprise preferably at least one concave lens for scattering the emitted light, at least one glass bar for scattering the emitted light, at least one collecting lens for collecting the incident light and/or at least one glass bar for collecting the incident light. By this, it is achieved that by means of the transmitters of the data transmission units in each case a sufficient area is illuminated, however through collection of the incident light nevertheless a necessary minimum light intensity for the receivers is achieved.

In an alternative embodiment of the invention the first data transmission unit and/or the second data transmission unit each can comprise a sensor unit for determining a relative movement between the first data transmission unit and the second data transmission unit. A control unit sets the direction in which the first data transmission unit and/or the second data transmission unit emits the light of the optical radio relay system in dependence of this determined relative movement. By this, an automatic tracking between the both data transmission units is achieved, so that it is sufficient if both data transmission units each comprise a transmitter and a receiver enabling a data transmission of the first data transmission unit to the second data transmission unit, as well as from the second data transmission unit to the first data transmission unit.

Further, it is advantageous if the first data transmission unit emits light having a light intensity in the range between a receiving sensitivity value and an overdrive value of the second data transmission unit. The receiving sensitivity value is the light intensity with which light must at least fall onto the receiver of the second data transmission unit, so that it can receive the data to be transmitted by the light. The overdrive value is the value which when exceeded leads to a control of the receiver of the second data transmission unit, so that a secure data transmission is no longer guaranteed. It is especially advantageous if the first data transmission unit emits light with an intensity between 90% of the overdrive value and the overdrive value. By emitting light nearly at the limit of the overdrive value it is achieved that a transmission reserve capacity is given, so that even in case of adverse weather conditions, for example in fog or rain the light received by the receiver of the second data transmission unit has a light intensity that is larger than the receiving sensitivity value. Consequently, data transmission can even be guaranteed in case of adverse weather conditions.

The first rail vehicle and the second rail vehicle are in particular connected to each other via a mechanical coupling, wherein at least one sensor is provided by means of which it can be determined whether the rail vehicles are connected via the coupling or not. Further, a control unit is provided that establishes the data transmission link via the optical radio relay system only if both rail vehicles are connected to each other via the mechanical coupling, and if this has been detected by the sensor.

BRIEF DESCRIPTION OF THE DRAWINGS

The drawings described herein are for illustrative purposes only of selected embodiments and not all possible implementations, and are not intended to limit the scope of the present disclosure.

Further features and advantages of the invention result from the following description which in connection with the enclosed Figures explains the invention in more detail with reference to embodiments.

FIG. 5 is a schematic illustration of a rail vehicle and of the area illuminated by the data transmission unit of another rail vehicle;

FIG. 6 is a schematic illustration of a data transmission unit according to a first embodiment of the invention;

FIG. 7 is a schematic perspective illustration of the data transmission unit according to FIG. 6 together with the area illuminated by the transmitters;

FIG. 8 is a schematic perspective illustration of two data transmission units according to a second embodiment of the invention;

FIG. 9 is a schematic illustration of two data transmission units and of the illuminated area;

Corresponding reference numerals indicate corresponding parts throughout the several views of the drawings.

DETAILED DESCRIPTION OF THE PREFERRED EMBODIMENTS

Example embodiments will now be described more fully with reference to the accompanying drawings.

Figure 1:
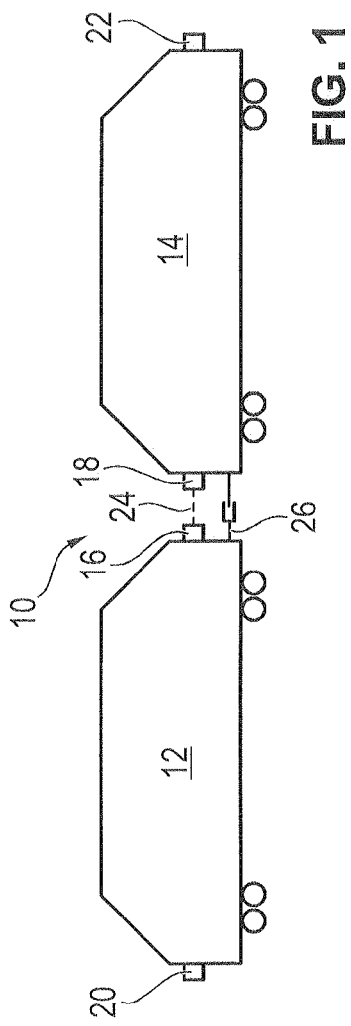
FIG. 1 is a schematic illustration of two rail vehicles and a device for transmitting data between the two rail vehicles.

FIG. 1 is a schematic illustration of two rail vehicles 12, 14 and a device 10 for transmitting data between the two rail vehicles 12, 14. The two rail vehicles 12, 14 can for example be locomotives, wagons or other railbound vehicles.

Device 10 comprises a first data transmission unit 16 that is arranged at an end of the first rail vehicle 12, and a second data transmission unit 18 arranged at the end of the second rail vehicle 14 facing the end of the first data transmission unit 16. Between the first data transmission unit 16 and the second data transmission unit 18 a data transmission link for transmitting data by means of an optical radio relay system is formed. The data transmission link is indicated schematically by the dashed line 24.

Further, at the first rail vehicle 12 a third data transmission unit 20 and at the second rail vehicle 14 a fourth data transmission unit 22 is arranged, wherein the third data transmission unit 20 is arranged at the end of the first rail vehicle 12 that is arranged opposite to the first data transmission unit 16, and wherein the second data transmission unit 22 is arranged at the end of the second rail vehicle 14 that is arranged opposite to the second data transmission unit 18. By means of the third data transmission unit 20 and by means of the fourth data transmission unit 22 data can be transmitted to another rail vehicle arranged at the respective end of the rail vehicle 12, 14. In this manner a data transmission via the data transmission link 24 that is formed by means of the optical radio relay system is possible between the individual rail vehicles along all rail vehicles combined to one train.

The first rail vehicle 12 and the second rail vehicle 14 are connected mechanically to each other via a coupling 26. Due to the coupling 26 the distance between the first rail vehicle 12 and the second rail vehicle 14 is between 2000 mm and 6000 mm.

Figure 2:
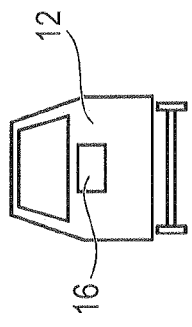
FIG. 2 is another schematic illustration of one of both rail vehicles with a data transmission unit.

FIG. 2 is a schematic illustration of the first rail vehicle 12. Here, the side of the first rail vehicle 12 facing the second rail vehicle 14 is illustrated, so that the first data transmission unit 16 is visible.

During the journey of both rail vehicles 12, 14 along a rail link between both rail vehicles 12, 14 a change of the relative position to each other occurs. By means of mechanical buffers in the coupling 26 via which both rail vehicles 12, 14 are connected to each other, when starting the train and when braking, a change of the distance up to 120 mm can occur. Due to the different wear of the wheels of the rail vehicles 12, 14 height differences up to 40 mm between both rail vehicles 12, 14 can occur. Further, a height offset can occur due to passing over uneven tracks, in particular ground depressions and elevations. This height offset can be up to 216 mm at both rail vehicles 12, 14.

Figure 3:
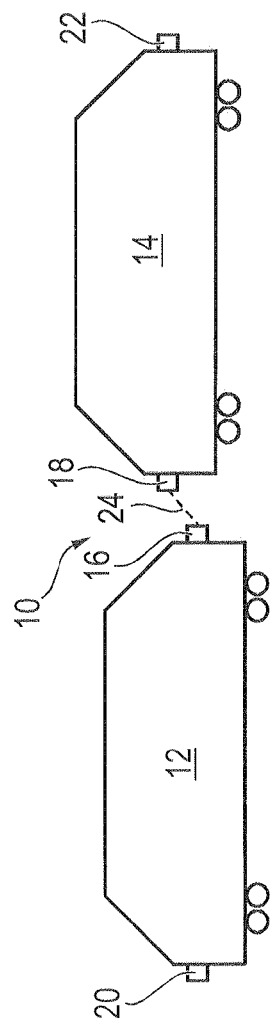
FIG. 3 is a schematic illustration of both rail vehicles at an offset height to each other.

FIG. 3 shows a schematic illustration of both rail vehicles 12, 14 at which there is such a height offset between both rail vehicles 12, 14.

Figure 4:
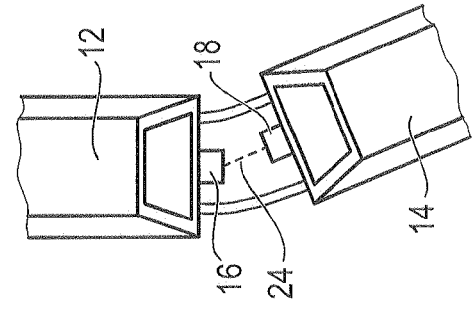
FIG. 4 is a schematic illustration of both rail vehicles according to FIGS. 1 to 3 when driving around curves.

When both rail vehicles 12, 14 pass over points and/or curves a lateral offset of the rail vehicles 12, 14 relative to each other can occur. The lateral offset can be up to 500 mm. FIG. 4 shows a schematic illustration of both rail vehicles 12, 14 during an afore-mentioned driving around corners.

Furthermore, during regular operation of the rail vehicles 12, 14 a torsion of both rail vehicles 12, 14 relative to each other can occur. Reasons for a torsion can for example be vibrations, passing over uneven tracks and/or environmental influences, in particular wind. By this, a height offset up to 210 mm between both rail vehicles 12, 14 can occur.

The data transmission units 16, 18 are such designed that in case of all above-described relative changes of position of both rail vehicles 12, 14 to each other, in particular also when combining these different position changes, data transmission by means of the data transmission link 24 via the optical radio relay system is possible. For this, the data transmission units 16, 18 are designed such that the light emitted by each of them illuminates an area of 4700 mm×1500 mm in the distance of the respective other rail vehicle 12, 14.

FIG. 5 is a schematic illustration of the second rail vehicle 12 as well as of the area 28 illuminated by the first data transmission 16 of the first rail vehicle 12. The illuminated area 28 is dimensioned such that on the one hand the data transmissions between the first rail vehicle 12 and the second rail vehicle 14 is secured, but on the other hand rail vehicles that are driving on the rails next to the rails on which the first and the second rail vehicles 12, 14 are driving, and that possibly are provided with corresponding data transmission units are not influenced by this.

FIG. 6 is a schematic illustration of the first data transmission unit 16. The other three data transmission units 18, 20, 22 are preferably constructed in the same way as the first data transmission unit 16. To simplify the description in the following only the design of the first data transmission unit 16 is described. The designs apply correspondingly to the other three data transmission units 18, 20, 22. In an alternative embodiment of the invention the data transmission units 16 to 22 can be designed differently.

The first data transmission unit 16 comprises four transmitters 30a to 30d for emitting the light required for the optical radio relay system as well as a receiver 32 for receiving the incident light of the second data transmission unit 18. The four transmitters 30a to 30d form the corners of a rectangle. The receiver is arranged such that its center point coincides with the intersection point of the diagonal of the rectangle spanned by the transmitters 30a to 30d.

The transmitters 30a to 30d each comprise in particular a laser diode by means of which the light required for the optical radio relay system and thus the data of the first data transmission unit are transmitted to the second data transmission unit 18. In particular, the laser diodes each have a wavelength of 850 nm and a performance in the range between 1 µW and 25 µW. Laser diodes having the above-mentioned properties of the protection class 1M according to EN6025-1, so that the data transmission units 16 to 22 can be used without any further safety precautions, as the laser light emitted by them is no danger for the human eye according to present knowledge.

The light emitted by the respective transmitters 30a to 30d has a light intensity in the range between a receiving sensitivity of the receiver 32 and an overdrive value of the receiver 32. The receiving sensitivity is the light intensity by means of which the receiver 32 has to be at least illuminated in order to guarantee a faultless data transmission via the data transmission link via optical radio relay system. The overdrive value is the light intensity at which there is just no overdrive of the receiver 32, so that a faultless data transmission up to this light intensity is possible. In a preferred embodiment of the invention the transmitters 30a to 30d are controlled such that they each emit a light intensity in the range between 90% of the overdrive vale and the overdrive value. By operating the transmitters 30a to 30d close to the overdrive value a power margin is achieved, so that even in case of extreme ambient conditions the light falling on the receiver of the second data transmission unit 18 has a sufficient light intensity, i.e. a light intensity that is greater than the receiving sensitivity, guaranteeing a faultless data transmission independent of the ambient conditions. Extreme ambient conditions can for example be rain, fog, dew and/or contaminations of the data transmission units 16 to 22.

FIG. 7 is a schematic perspective illustration of the first data transmission unit 16 according to FIG. 6. By means of the circles 34a to 34d those areas are illustrated that are illuminated by the individual transmitters 30a to 30d in the distance of the not-illustrated second data transmission unit 18. Here, all transmitters 30a to 30d each emit in parallel the same light pulses, and consequently the data coded by the light pulses are transmitted without errors. By means of the four areas 34a to 34d the entire area 28 that is to be illuminated is illuminated as illustrated in FIG. 5, so that at all changes in position of the rail vehicles 12, 14 to each other occurring during regular operation of the rail vehicles 12, 14 guarantee a faultless, reliable data transmission.

As can be seen clearly from FIG. 7, the data transmission unit 16 is formed as a compact box in which all components required for data transmission are included. By means of designing the data transmission unit 16 as a compact box it is achieved that the data transmission units 16 to 22 can be retrofitted to existing rail vehicles that are not yet provided with such a data transmission unit 16 to 22 for data transmission via optical radio relay system, so that even older rail vehicles can be used together with new rail vehicles that are already fully equipped by the manufacturer with such a data transmission unit for data transmission via optical radio relay system.

FIG. 8 is a schematic illustration of a transmitter 36 of the first data transmission unit 16 and a receiver 38 of the second data transmission unit 18 according to a second embodiment of the invention. The transmitter 36 comprises a diode 40, the receiver 38 a receiving element 42 for receiving the light pulses emitted. The light emitted by the diode 40 of the transmitter 36 is scattered via a dispersing lens 44 and a glass bar 46, so that by correspondingly selecting the dispersing lens 44 and the glass bar 46 a desired radiation angle of the light emitted by the transmitter 36 is adjusted. The boundaries of the light emitted by the transmitter 36 are schematically illustrated by the dashed lines 50, 52. In an alternative embodiment of the invention the transmitter can as well comprise only a lens 44 for scattering the emitted light and no glass bar 46 or another rod made from another translucent material.

The receiver 38 comprises a converging lens 54, a glass bar 56 and another lens 58 for concentrating the incident light. By concentrating the light a sufficient light intensity of the incident light is achieved, despite a relatively small area of the receiving element 42 of the receiver 38, guaranteeing a faultless data transmission. In an alternative embodiment of the receiver 38 just a converging lens 54 can be used for concentrating the incident light. The receiving element 42 is in particular designed as a semi-conductor. The transmitter 36 and the receiver 38 preferably have the same acceptance angle.

FIG. 9 is a schematic illustration of a transmitter 60 of the first data transmission unit 16 and a receiver 62 of the second data transmission unit 18 according to a third embodiment of the invention. The light emitted by the transmitter 60 is indicated by means of the arrows 64a to 64c. By means of a dispersing lens 65 the light 64a to 64c is dispersed, so that in the distance of the second rail vehicle 14 the area having the reference sign 66 is illuminated by the transmitter 60. The receiver 62 comprises a receiving element 70 as well as a converging lens 72. By means of the converging lens 72 the part of the light emitted by the transmitter 60 that falls on the converging lens 72 is converged and thus directed in converged form to the receiving element 70. The converged light is exemplarily indicated by the arrows 74a to 74c.

Figure 10:
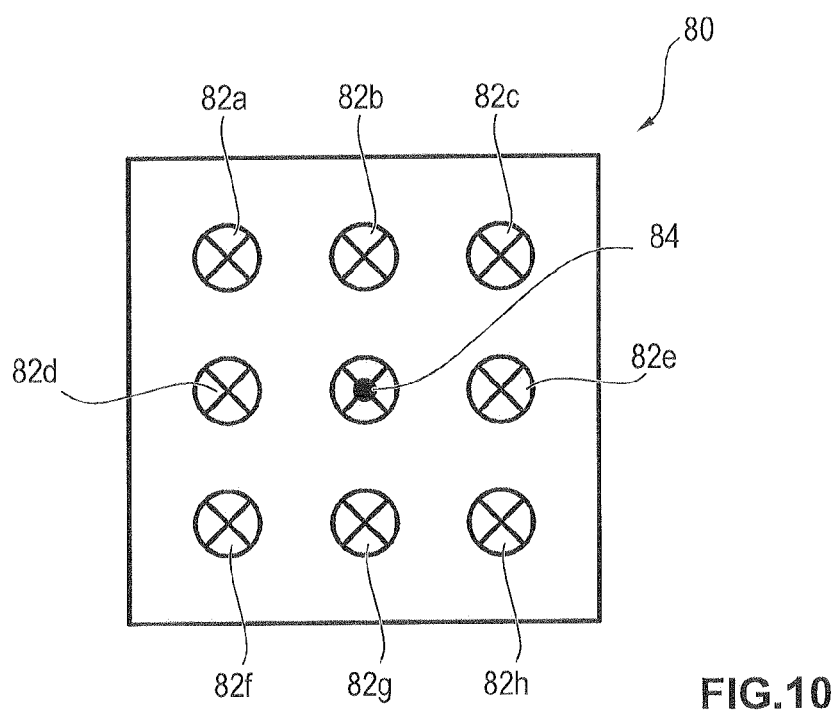
FIG. 10 is a schematic illustration of two data transmission units according to a third embodiment of the invention.

FIG. 10 is a schematic illustration of a data transmission unit 80 according to a fourth embodiment of the invention. In this fourth embodiment the data transmission unit 80 comprises eight transmitters 82a to 82h arranged on the circumferential line of a square as well as a transceiver 84 arranged in the center of the square by means of which data can be both received and emitted.

Alternatively, different embodiments of transmitters, receivers and transceivers are possible. Further, the data transmission units 16 to 22, 80 can comprise more or less than the previously described number of receivers, transmitters and/or transceivers. In particular, the data transmission units 16 to 22, 80 can comprise one transmitter and several receivers, one receiver and several transmitters or several receivers and several transmitters. In each case one receiver and one transmitter can be combined to a transceiver resulting in a simple and compact design.

Figure 11:
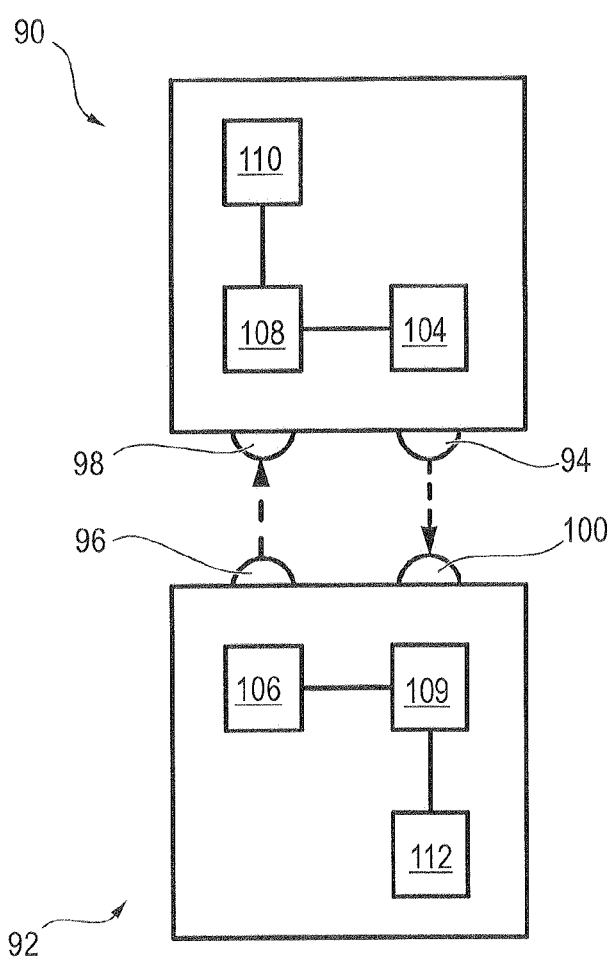
FIG. 11 is a schematic illustration of two data transmission units according to a fourth embodiment of the invention.

FIG. 11 is a schematic illustration of a fifth data transmission unit 90 and a sixth data transmission unit 92 according to a further embodiment of the invention. The data transmission units 90, 92 each comprise a transmitter 94, 96 and a receiver 98, 100. Further, the data transmission units 90, 92 each comprise a sensor 104, 106 for determining a relative change in position of the rail vehicles 12, 14 to each other. Further, the data transmission units 90, 92 each have a control unit 108, 109 that, depending on the determined relative changes in position to each other, controls the transmitters 94, 96 such that, independent of the relative position of the rail vehicles 12, 14 to each other, the light emitted by the transmitters 94, 96 and thus the data encoded by the light falls on the receivers 98, 100 of the respective other data transmission 90, 92. In this way, a tracking is achieved, so that each data transmission unit 90, 92 only has to possess one transmitter 94, 96 and one receiver 98, 100.

In particular, this tracking is carried out in form of a control loop, in which case each data transmission unit 90, 92 comprises a further sensor 110, 112 for determining the light intensity of the incident light at the position of the receiver 98, 100. If the sensor 110, 112 determines that the incident light intensity lies below a preset limit, by means of the control unit 108, 109 of the other data transmission unit 90, 92 the transmitter 94, 96 of this data transmission unit 90, 92, in particular the beam angle of the transmitter 94, 96 is adjusted such that the light intensity falling on the receiver 98, 100 again exceeds the limit, thus guaranteeing a faultless data transmission. The transmitter 94, 96 is in particular adjusted by means of iteratively adjusting the beam angle of the transmitter 94, 96 in at least two directions. Alternatively, a readjustment in combination with the change in the angle between the wagon and the mechanical coupling can be realized.

The data transmission units 16, 18, 20, 22, 60, 90, 92 are in particular designed such that through them at the same time light pulses can be emitted and other light pulses can be received. In this way a bidirectional data transmission, in particular a full-duplex data transmission is possible. In particular opto-electrical transducers are used as receiving elements.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

The invention claimed is:

1. A device for transmitting data, comprising:
a first rail vehicle having an end;
a second rail vehicle having an end facing the end of the first rail vehicle;
a first data transmission unit arranged at the end first rail vehicle, and
a second data transmission unit arranged at the end of the second rail vehicle,
wherein between the first data transmission unit and the second data transmission unit a data transmission link for transmitting data between the first rail vehicle and the second rail vehicle is formed,
wherein the data transmission via the data transmission link is carried out by means of an optical radio relay system
wherein the distance between the first data transmission unit and the second data transmission unit has a value in the range between 1500 mm and 6000 mm; and
wherein at least the first data transmission illuminates an area in the range between 4500 mm×1300 mm to 5000× 1700 mm on the second transmission unit.

2. The device according to claim 1, wherein the first data transmission unit and/or the second data transmission unit each comprise a transmitter and at least two receivers.

3. The device according to claim 1, wherein the first data transmission unit and/or the second data transmission unit each comprise a receiver and at least two transmitters.

4. The device according to claim 1, wherein the first data transmission unit and/or the second data transmission unit each comprise at least two transmitters and at least two receivers.

5. The device according to claim 1, wherein the first data transmission unit and/or the second data transmission unit each comprise at least one transceiver.

6. The device according to claim 1, wherein the first data transmission unit and/or the second data transmission unit include at least four transmitters that are rectangularly arranged, and in that one receiver is arranged in the center of the rectangle.

7. The device according to claim 1, wherein the first data transmission unit and/or the second data transmission unit each comprise at least one diode, in particular a laser diode.

8. The device according to claim 7, wherein the diode emits light with a wavelength in a range between 800 nm and 900 nm.

9. The device according to claim 7, wherein the diode has a power in the range between 1 μW and 25 μW.

10. The device according to claim 1, wherein the first data transmission unit and/or the second data transmission unit each comprise at least one diverging lens for scattering the emitted light, at least one glass bar for scattering the emitted light, at least one collecting lens for collecting the incident light and/or at least one glass bar for collecting the incident light.

11. The device according to claim 1, wherein the first data transmission unit and/or the second data transmission unit comprises a sensor unit for determining a relative movement between the first data transmission unit and the second data transmission unit and a control unit that determines the direction in which the first data transmission unit or the second data transmission unit emits the light of the optical radio relay system in dependence of the determined relative movement.

12. The device according to claim 1, wherein the first data transmission unit emits light with a light intensity in the range between a receiving sensitivity value and an override value of the second data transmission unit.

13. The device according to claim 1, wherein the first rail vehicle and the second rail vehicle are connectable to each other via a mechanical coupling, in that a sensor for detecting a connected condition is provided, and in that a control unit only generates a data transmission link if the sensor has detected the connected condition.

* * * * *